United States Patent [19]

Larkin

[11] Patent Number: 5,303,545
[45] Date of Patent: Apr. 19, 1994

[54] PRESSURE BASED CLOSE LOOP THRUST CONTROL IN A TURBOFAN ENGINE

[75] Inventor: Louis J. Larkin, West Palm Beach, Fla.

[73] Assignee: United Technologies Corporation, Hartford, Conn.

[21] Appl. No.: 956,205

[22] Filed: Oct. 5, 1992

[51] Int. Cl.$^5$ ............................. F02C 9/28; F02K 1/17
[52] U.S. Cl. ........................................ 60/239; 60/243; 60/39.281
[58] Field of Search ................... 60/226.1, 233, 235, 60/243, 39.161, 239, 39.281

[56] References Cited

U.S. PATENT DOCUMENTS

| | | | |
|---|---|---|---|
| 4,809,500 | 3/1989 | Roberts | 60/235 |
| 4,813,226 | 3/1989 | Grosselfinger et al. | 60/235 |
| 4,984,425 | 1/1991 | Smith | 60/39.161 |
| 5,022,224 | 6/1991 | Smith | 60/39.161 |

*Primary Examiner*—Louis J. Casaregola
*Attorney, Agent, or Firm*—Robert E. Greenstien

[57] ABSTRACT

Fuel flow and nozzle area are controlled by a multivariable control. A requested fan speed is compared with measured fan speed, producing an error signal which is translated in a proportional-integral inner control loop into a requested compressor pressure signal that represents an acceptable rate of change in compressor pressure for difference between requested and measured fan speed. The error signal is compared with measured compressor pressure; the difference being used in a multi-variable control to adjust fuel flow and turbine exhaust area to achieve the requested compressor pressure.

10 Claims, 5 Drawing Sheets

PRESSURE BASED CLOSE LOOP THRUST CONTROL IN A TURBOFAN ENGINE

TECHNICAL FIELD

This invention relates to controlling the thrust in gas turbine engines.

BACKGROUND OF THE INVENTION

The fuel controls used in gas turbine engines fundamentally are intended to regulate the quantity of fuel supplied to the burner as a function of requested power, as indicated by power lever advance (PLA). More sophisticated controls such as multi-variable controls take into account one or more operating characteristics of the engine and adjust the fuel control to provide requested thrust. Closed loop fuel controls with multi-variable capability may "close the loop" on compressor speed and other variables. To provide good performance under all the different operating conditions in which an aircraft engine may operate, multivariable controls have a variety of different transfer characteristics, each selected based upon the combination of the all the operating characteristics supplied to the control at any instant of time. Multi-variable controls therefore switch at some point between one type of transfer function or operating mode to another, and these transition points can be extremely problematic in gas turbine engines, especially during high power acceleration and deceleration when the engine runs with the least stall margin. In general terms, the problem arises because at the switch-over point there is a control discontinuity; the control is momentarily not in complete control. If stall margin is small, a stall may take place rapidly. A technique that has been used to alleviate this shortcoming puts limits on output from the multi-variable control outputs. For example, there could be a limit in the amount of rate of fuel flow change. Using an analogy to the operation of an automobile automatic transmission, these limits are something like slightly relieving accelerator pressure at the moment of shifting to attain a smooth gear change. While these approaches avoid some of the transient related problems, they do so at the expense of acceleration rate. The critical interaction between a multi-variable control and stall margin becomes more problematic in high bypass gas turbine engines that have controllable exhaust nozzles. Those engines that are likely used under high performance conditions, especially fighter aircraft having vectoring nozzles. Engine stall occurs for a number of reasons, but, in any case, is highly dependent on compressor discharge pressure (PB) and engine exhaust pressure (P6) which is affected by nozzle area and orientation. High-speed compressor pressure is an excellent indication of engine power at any particular time during engine operation. To estimate stall margin, it is necessary to take into account compressor discharge (exhaust) pressure, discharge pressure, turbine speed (N2). Engine thrust is determined by engine airflow and exhaust velocity. The exhaust velocity is set by discharge pressure (P6) and the airflow is determined by fan speed (N1). It is thus desirable to associate fan speed with PLA, and regulate P6 to provide optimum thrust and fan stall margin at that airflow. Control of these variables provides precise thrust control, but does not ensure adequate compressor stall margin or burner stability during gross engine transitions.

DISCLOSURE OF THE INVENTION

Among the objects of the present invention is providing a superior multi-variable control, in particular, one that prevents excessive excursions above the acceptable compressor pressure operating levels.

According to the present invention, a requested compressor pressure is derived from requested fan speed and measured fan speed, limited to a maximum rate of change and applied to a fuel control to adjust fuel flow.

According to the present invention, power requests in the form of power lever advance (PLA) are provided to a signal processor that computes a fan speed request signal. This signal is compared with the actual fan speed to produce an error signal that is applied to a logic loop process wherein it is adjusted by taking into account a number of engine operating characteristics such as the compressor speed and the ambient temperature. The consequent "compensated" fan speed error signal is used to control a proportional/integral inner loop process that produces a compressor pressure request, which is summed with a feedback signal of actual compressor pressure, producing a compressor pressure error signal. This error signal is applied to a multi-variable control, which depending on the magnitude of the compressor pressure error signal, varies fuel flow and optional exhaust area to produce the requested compressor pressure.

According to the invention, compressor pressure limits during acceleration and deceleration are applied to the proportional integral control, limiting the requested compressor pressure output signal that it produces. These limits are based upon the turbine speed and the engine exhaust pressure.

According to the invention, the turbine speed that is used to create those limits is corrected based upon ambient temperature and fan speed.

According to the present invention, the multi-variable control receives, in addition to the compressor pressure error signal, a signal indicating the difference between a scheduled engine exhaust pressure and the actual engine exhaust pressure. The scheduled or requested engine exhaust pressure (P6R) is based upon ambient pressure (PT2) and fan speed (N1).

According to the present invention, the limits on acceleration and deceleration compressor pressure are produced by a logic circuit which calculates the compressor transient excursions away from a steady-state operating condition for acceptable compressor pressure.

A feature of the present invention is that it allows for a positive stall avoidance during engine transients without switching control modes or limiting the outputs of the multi-variable control. Also, directly controlling PB (more precisely compressor pressure ratio) provides a reliable means of stall avoidance because compressor stall is closely related to compressor pressure.

Another feature of the invention is that using fan speed request to drive PB is equivalent to using thrust requests to drive core power request because PB is the best indicator of core power. This has fundamental significance in designing multi-variable controls. In these applications, rotor speeds may become transiently disassociated from airflows and thus loose significance in the engine's cycle. A particular feature of the present invention therefore is that it allows for the most effective and least complex multi-variable control designs.

Other objects, features and benefits of the invention will be apparent to one skilled in art from the drawings and the discussion that follows.

BEST MODE FOR CARRYING OUT THE INVENTION

Figure 1:
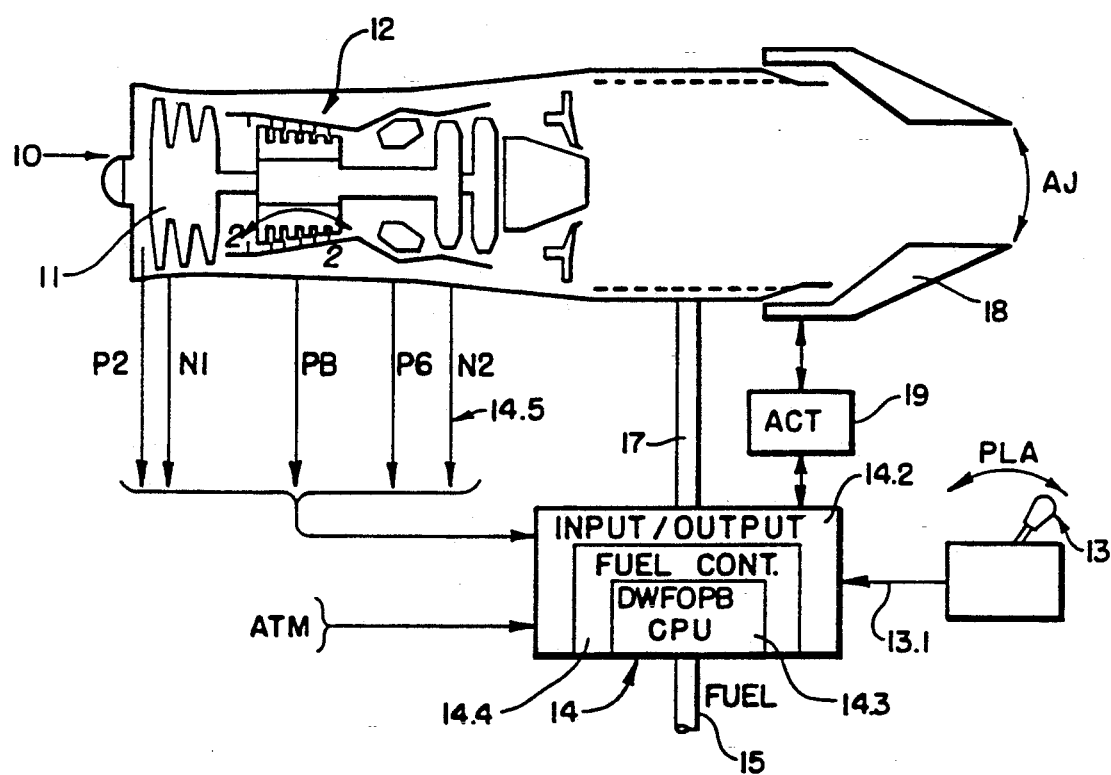
FIG. 1 is block diagram showing a gas turbine engine and a control system for carrying out the present invention.

A gas turbine engine 10 in FIG. 1 has low speed fan 11 which is driven by a high speed compressor 12. A power lever 13 produces a signal which is supplied over a line 13. 1 to a control 14, such as a "FADEC" (Full Authority Digital Engine Control) that contains a CPU or signal processor 14.3. The signal processor is coupled to the power lever and the engine through an input/output section 14.2. The control controls fuel flow 17 to the combustor stage of the engine as a function of the position of the power lever, and, according to the invention, fuel flow is additionally controlled to achieve certain compressor pressure operating characteristics. The control is connected over a plurality of signal carrying lines 14.5 to the engine. The signals on those lines manifest fan speed N1, compressor pressure PB, pressure P6, the speed of the compressor fan N2 and inlet pressure PT2. Ambient or atmospheric pressure ATM is also supplied to the input/output section of the control 14. The system shown in the drawing includes an adjustable exhaust nozzle 18 to vary engine exhaust area AJ. To that end, a nozzle actuator (ACT) 19 receives signals from the control to change the nozzle area, ideally by comparing the position of the actuator with a selected or requested position to achieve a specific nozzle area.

Figure 2:
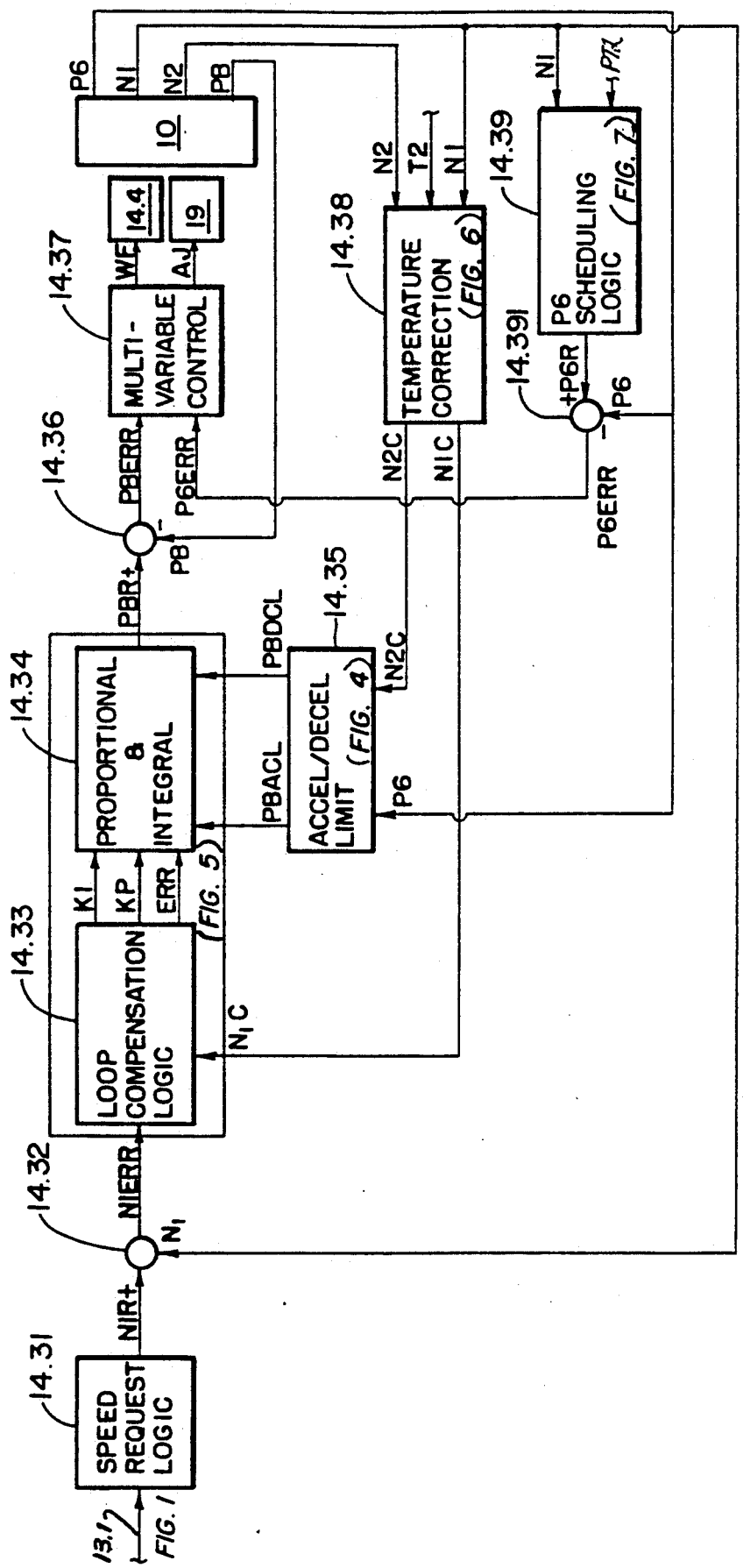
FIG. 2 is a software block diagram of a control system embodying the present invention.
Figure 3:
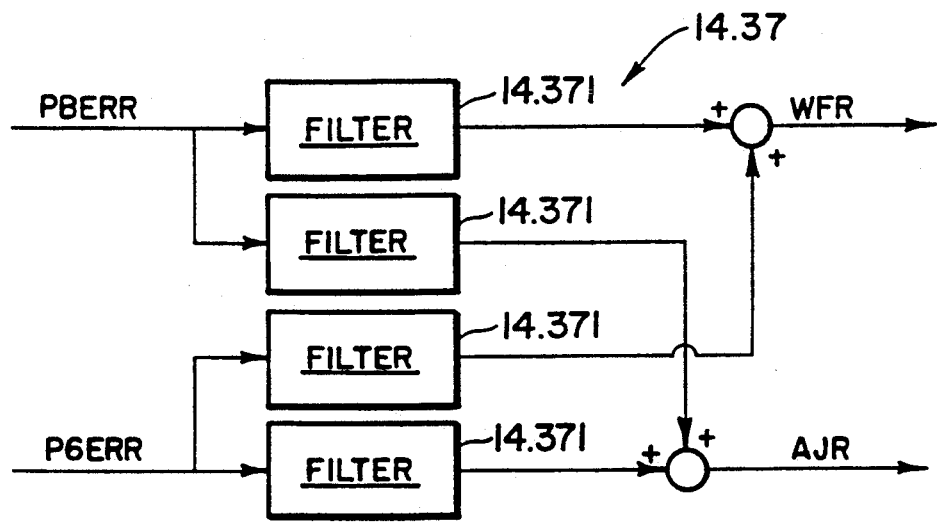
FIGS. 3, 4, 5, 6, and 7 are functional software block diagrams of elements of the system shown in FIG. 2.
Figure 4:
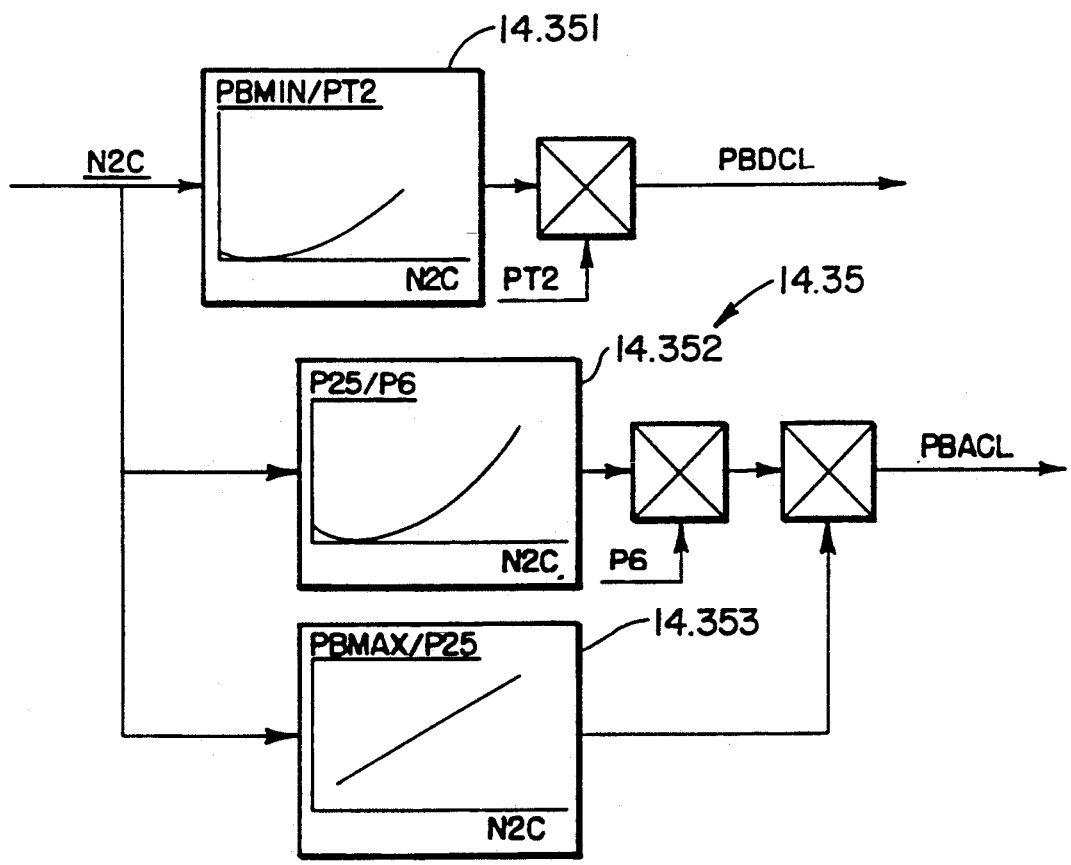
Figure 5:
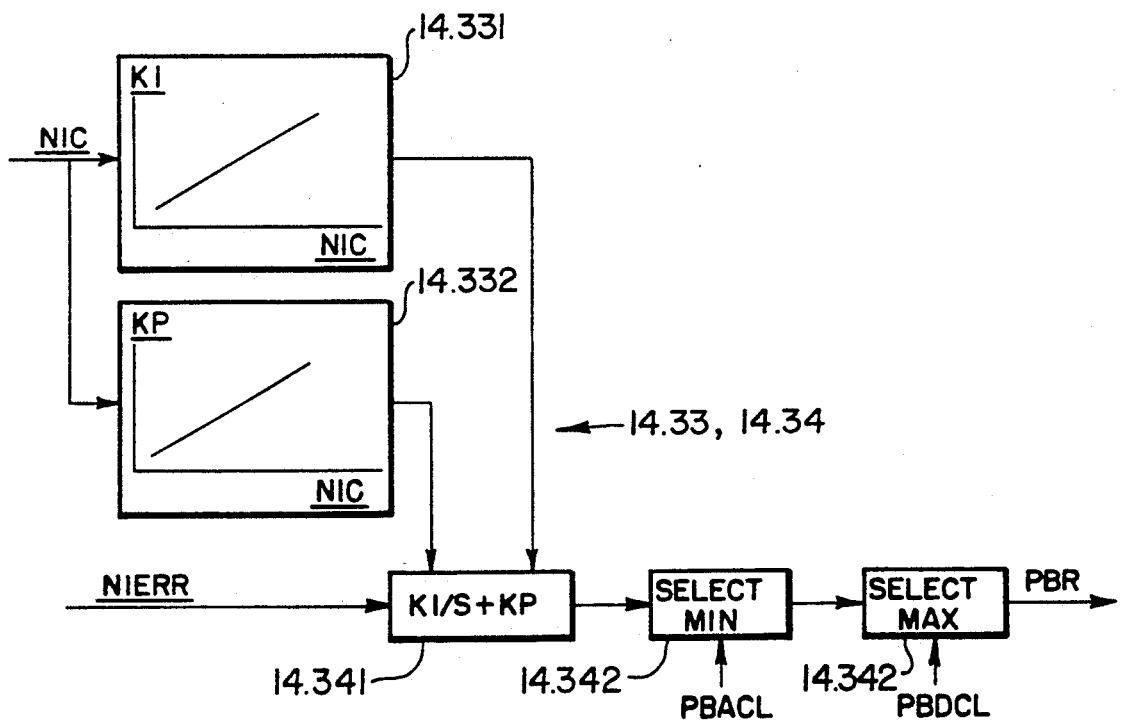
Figure 6:
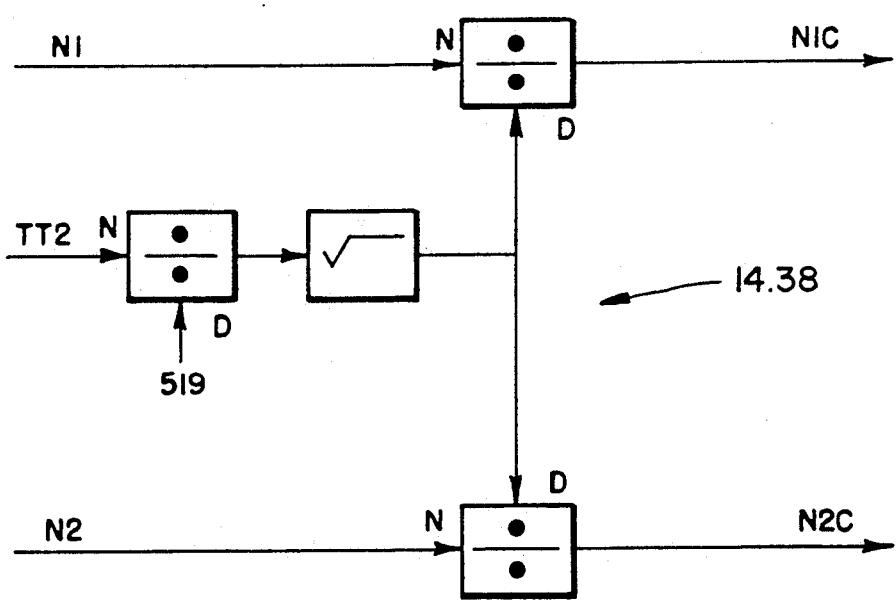

In FIG. 2, which shows the signal processing steps implemented by the control to carry out the invention, the output from the power lever on line 16.1 is processed through a speed request logic function 14.31 to produce a requested or commanded fan speed signal N1R. Signal N1R is summed at 14.32 with the actual fan speed N1 to produce a different signal, N1ERR, which manifests the difference between the commanded speed and the actual speed. Signal N1ERR is then processed using a loop compensation logic function 14.33 and a proportional-integral transfer function 14.34 to provide an output signal PBR that manifests a desired of commanded compressor pressure for the N1ERR. FIG. 5 shows in greater detail the functional relationship between PBR and certain engine operating characteristics, namely fan speed N1 corrected for temperature, signal N1C, and computed limits on compressor acceleration and deceleration levels, i.e. signals PBACL and PBDCL, which are provided by an acceleration and deceleration limit function 14.35, shown in detail in FIG. 4.

Figure 7:
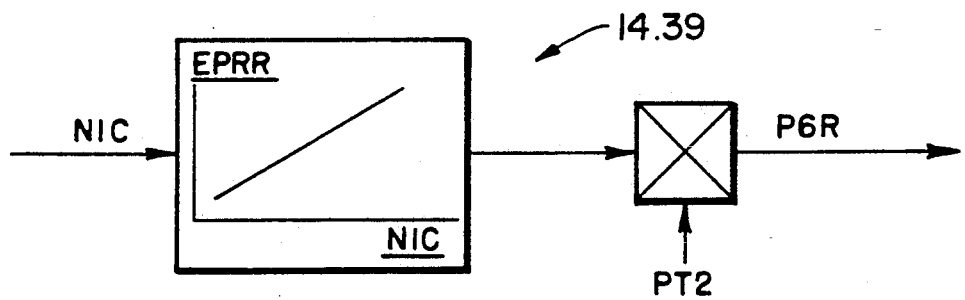

The computed compressor pressure signal PBR is compared to actual compressor pressure PB at 14.36, producing an error signal PBERR. This signal is supplied to a multivariable fuel control 14.37, which produces two output signals, one for controlling fuel flow (signal WFR) and a second for controlling exhaust area (signal AJR). In this particular embodiment of the invention, the multivariable control varies the magnitude of WFR and AJR based on the magnitude of PBERR and a signal P6ERR, which is produced by comparing engine exhaust pressure P6 with a requested pressure P6R that is computed by a scheduling process that uses the values of N1 and inlet pressure, signal PT2, as shown in detail in FIG. 7.

Figure 8:
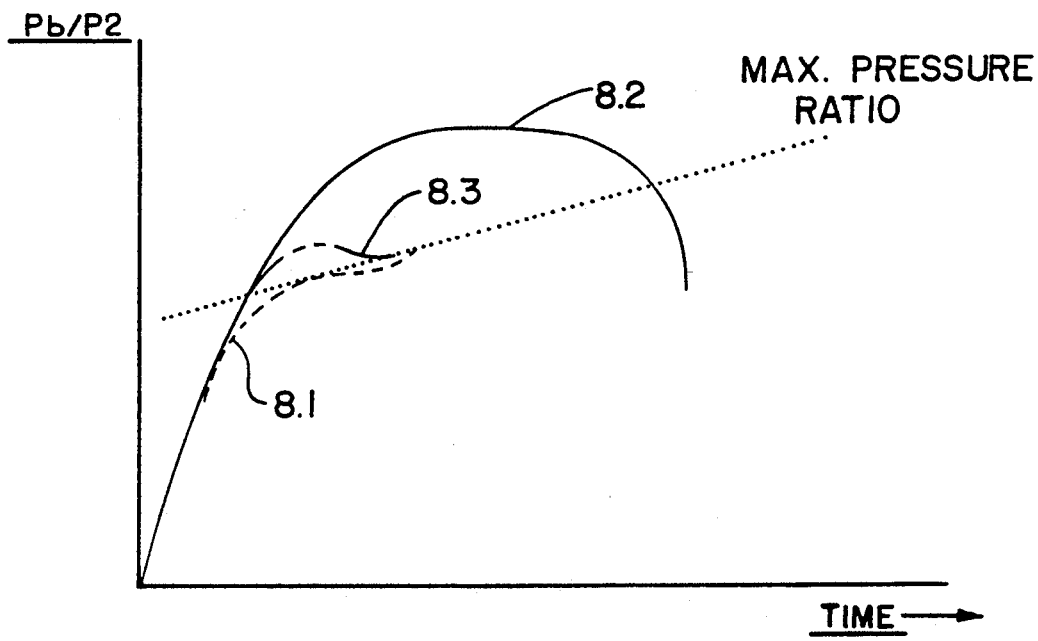
FIG. 8 is a time-base graph showing the relationship with compressor pressure and time using the present invention and the prior art.

As the power lever is advanced or retracted, fuel flow and exhaust area are adjusted to achieve the compressor pressure and engine exhaust pressure manifested by the signals PBR and P6R. FIG. 8 demonstrates that when fan speed N1 (line 8.1) is controlled based on compressor pressure with the present invention, compressor pressure overshoot 8.2 (area above MAX. PRESSURE RATIO) is avoided when the power lever position is changed, even if speed is controlled with standard overrides (line 8.3). The overshoots 8.2, 8.3, it should be recalled, can cause a compressor pressure level sufficient to create stall conditions. PB is not time controlled; rather the allowable pressure excursions during acceleration and deceleration are limited by the acceleration and deceleration process shown in FIG. 4. There the two signals PBDCL and PBACL are produced by using the value of P6 and the N2C. To produce PBDCL, inlet pressure PT2 is multiplied with an outputted value of minimum compressor pressure PBMIN divided by PT2 for the instantaneous value of N2C from function 14.351. PBACL, on the other hand, is produced by first generating a value for P25/P6 for the instantaneous N2C from function 14.352, multiplying the value by the value of P6 to produce a value multiplied by a value of PBMAX based on a maximum schedule for PBMAX/P25 for N2C from function 14.353.

PBACL and PBDCL determine the "select" levels in FIG. 5, that is, the instantaneous computed value for PBACL and PBDCL that can be used to control the proportional-integral process. FIG. 5 also illustrates that N1C is used to generate the instantaneous values for K1 and KP (from functions 14.331 and 14.332) these being the gain and proportionality constants for the proportional integral control transfer function 14.341, giving the proportional-integral dynamic characteristic functionally related to the magnitude of N1C. By this process, the requested or scheduled compressor pressure PBR is dynamically related to the instantaneous magnitude of N1C but limited based on the dynamic values of PBACL and PBDCL which are selected as minimum pressure and maximum pressure levels at 14.342 and 14.343. This produces the time response illustrated in the chart in FIG. 8. The multivariable control applies PBERR and P6ERR to filters 14.371 (lead and lag circuits) to produce the requested fuel flow and exhaust area signals WFR and AJR.

One skilled in the art may be able to make modifications and variations, in whole or in part, to the discussed embodiment without departing from the true scope and spirit of the invention based on the foregoing discussion of the invention.

I claim:

1. A gas turbine engine having an engine control that responds to a thrust required to control fuel flow to an engine burner that powers a fan, the engine control comprising signal processing means responsive to a plurality of engine operating parameters for controlling said fuel flow to control engine thrust, characterized in that said signal processing means comprises:

means responsive to the thrust control for producing a first signal manifesting a requested speed for the fan; for producing a second signal manifesting measured speed of the fan; for producing a third signal that manifests the difference between said first and second signals; for producing a fourth signal the magnitude of which is a calculated compressor pressure increase over a selected time interval following the production of said third signal; for producing a fifth signal that manifests measured compressor pressure; for producing a sixth signal that manifests the difference between said fourth and said fifth signals; and for adjusting fuel flow to the burner as a function of the magnitude of said sixth signal to achieve a compressor pressure manifested by said fourth signal.

2. The engine described in claim 1 characterized in that the magnitude of said fourth signal is varied in relation to compressor speed when said third signal is produced.

3. The engine described in claim 2, characterized by exhaust area control means for adjusting exhaust area of the engine- exhaust and said signal processing means comprising means for providing a signal to said exhaust area control means for adjusting said area as a function of the magnitude of said sixth signal to achieve the compressor pressure manifested by said fourth signal.

4. The engine described in claim 3, characterized in that said signal processing means comprises means for providing limit signals manifesting limits on compressor pressure during acceleration and deceleration as a function of compressor speed and ambient temperature, said limit signals limiting the magnitude of said fourth signal.

5. The engine described in claim 4, characterized in that said signal processing means comprises means for providing an augmentation signal to adjust fuel flow and exhaust area as a function of the difference between measured engine exhaust pressure and a requested exhaust pressure, as a function of compressor speed and ambient pressure.

6. The engine described in claim 4, characterized in that said limits are derived by correcting measured compressor speed for measured ambient temperature.

7. The engine described in claim 1, characterized in that said signal processing means comprises means for modifying the magnitude of said fourth signal in relation to the speed of the fan corrected for ambient temperature.

8. The engine described in claim 1, characterized in the said signal processing means comprises means for providing said fourth signal by a proportional plus integral function and varying the gain and time constant of in steps as a function of the magnitude of said third signal.

9. The engine described in claim 4, characterized in the said signal processing means comprises means for providing said fourth signal by a proportional plus integral function and varying the gain and time constant of said steps as a function of the magnitude of said third signal.

10. The engine described in claim 7, characterized in the said signal processing means comprises means for providing said fourth signal by a proportional plus integral function and varying the gain and time constant of said steps as a function of the magnitude of said third signal.

* * * * *